United States Patent [19]

McMaster et al.

[11] 4,437,872
[45] Mar. 20, 1984

[54] APPARATUS FOR BENDING AND TEMPERING GLASS SHEETS

[76] Inventors: Harold A. McMaster, 420 Water St., Woodville, Ohio 43469; Norman C. Nitschke, 9102 Buck Rd., Perrysburg, Ohio 43551; John S. Nitschke, 324 E. Second, Perrysburg, Ohio 43551

[21] Appl. No.: 268,535

[22] Filed: May 29, 1981

Related U.S. Application Data

[60] Division of Ser. No. 118,822, Feb. 5, 1980, Pat. No. 4,282,026, which is a continuation of Ser. No. 872,201, Jan. 25, 1978, abandoned.

[51] Int. Cl.³ .................... C03B 23/023; C03B 23/025
[52] U.S. Cl. ........................ 65/104; 65/106; 65/107; 65/268; 65/273; 65/351; 65/25.4
[58] Field of Search ................ 65/104, 106, 107, 114, 65/268, 273, 348, 351, 25.4

[56] References Cited

U.S. PATENT DOCUMENTS 4,229,199 10/1980 Seymour ........................ 65/273 X
4,229,200 10/1980 Seymour ........................ 65/273 X
4,233,089 11/1980 Seymour ........................ 65/107

*Primary Examiner*—Arthur D. Kellogg
*Attorney, Agent, or Firm*—Brooks & Kushman

[57] ABSTRACT

Sheet glass is heated during conveyance within a furnace housing having a fixed roof and vertically movable side doors that define side slots through which ends of conveyor rolls project outwardly to be supported and frictionally driven by continuous drive loops slidably driven over external support surfaces that extend alongside the side slots. A vacuum holder of the apparatus is positioned within the furnace housing above the conveyor and has a downwardly facing surface with spaced openings in which a vacuum is drawn to receive a glass sheet from the conveyor and support the sheet above the conveyor. The holder surface is disclosed as being both planar and curved and as having a porous cover of ceramic fibers so as to distribute the vacuum and prevent marring of the glass as it is supported. A greater vacuum is drawn to initially support the glass and a lesser vacuum is subsequently drawn to prevent glass deformation at the spaced openings. Vertically movable auxiliary lifters positioned between the rolls or vertical movement of the vacuum holder facilitates glass pickup. Sensing of the glass position along the conveyor and operation of a locator cooperatively provide accurate positioning of the glass on the holder surface without requiring the conveyor to be stopped prior to the holder operation. A carrier mold ring moves under the supported glass and the vacuum is then terminated so the glass drops onto the ring and bends under the bias of gravity in a manner that allows thin glass to be accurately bent. Subsequently the mold ring is moved from the furnace to a quench unit between upper and lower blastheads that temper the bent glass. Increased air is then supplied to the lower blasthead relative to the upper blasthead to lift the glass sheet off the ring and allow return of the ring to the furnace.

19 Claims, 18 Drawing Figures

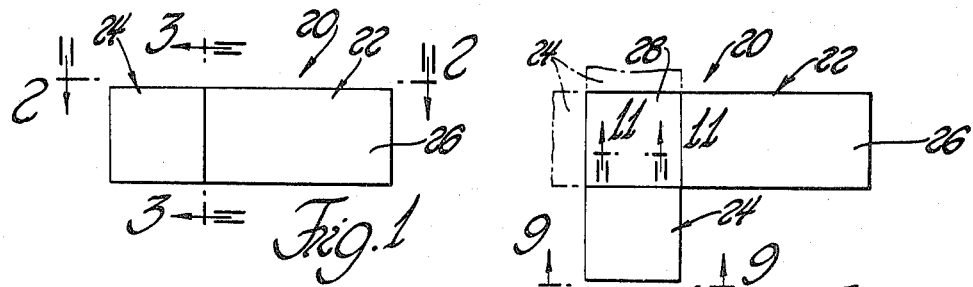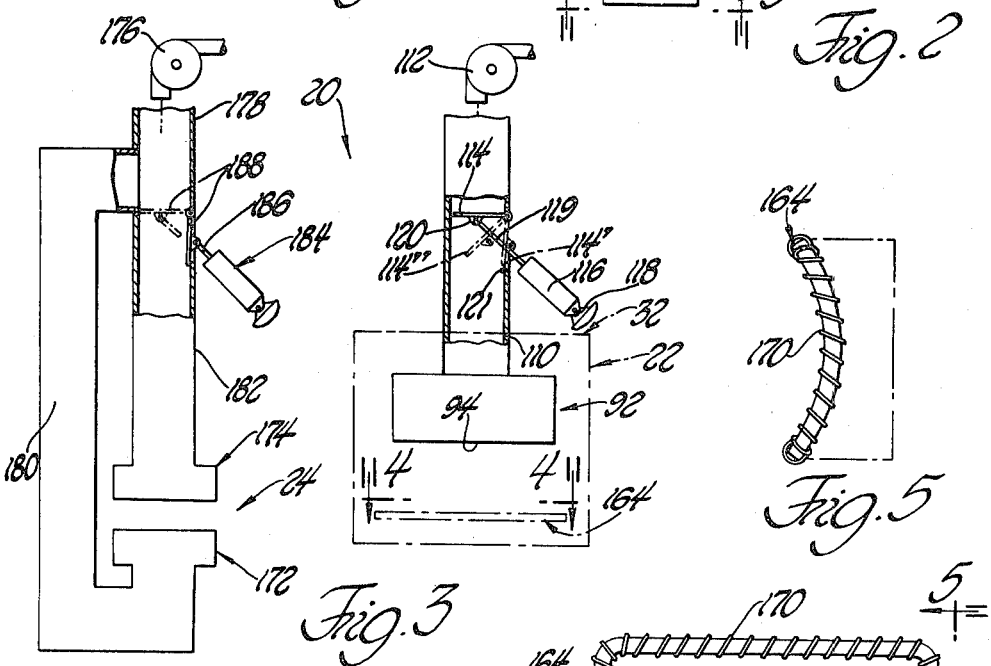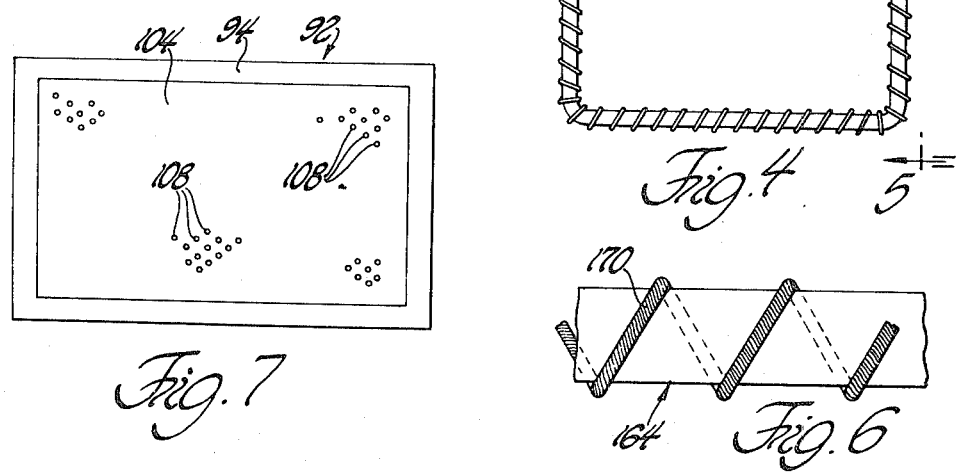

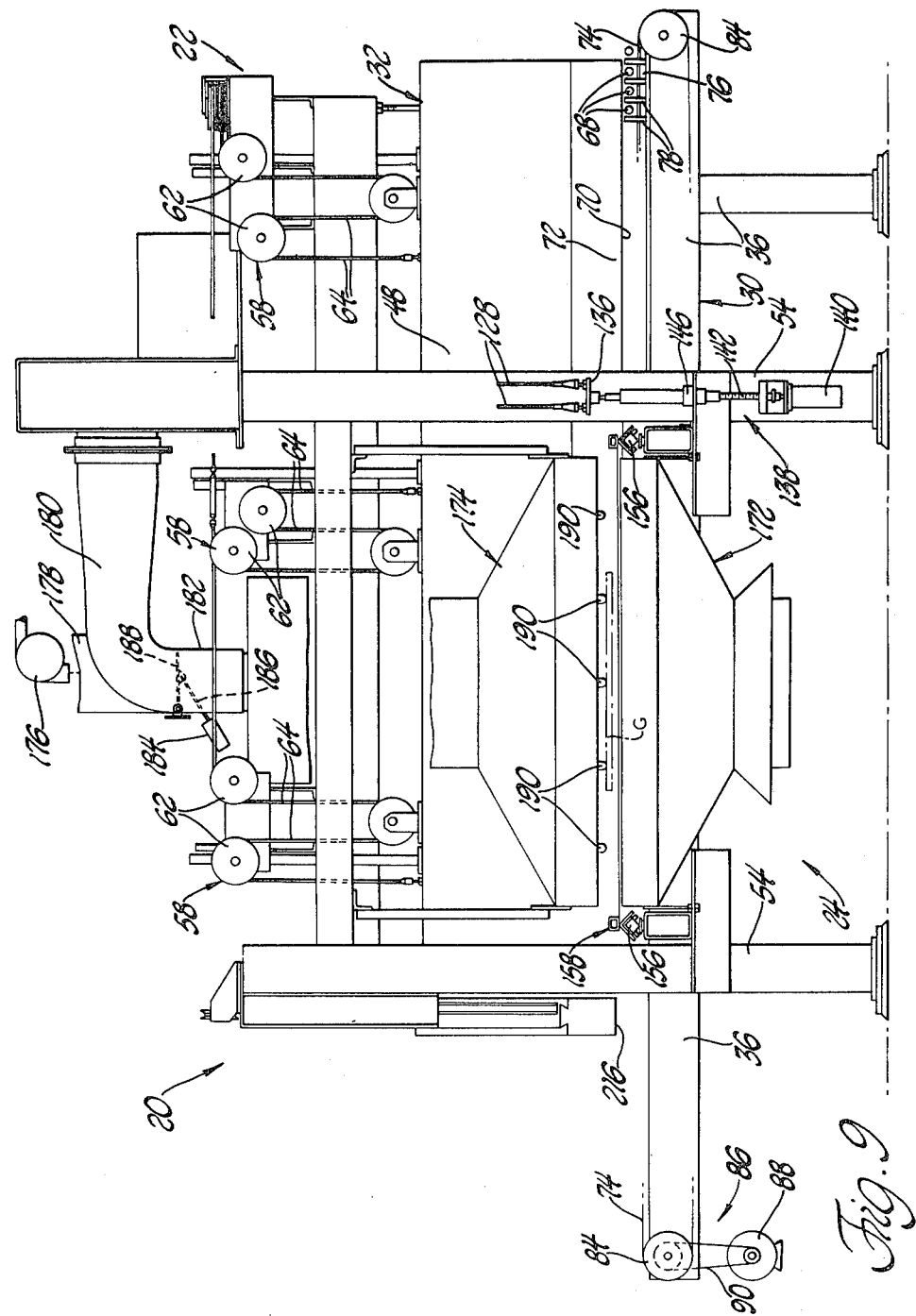

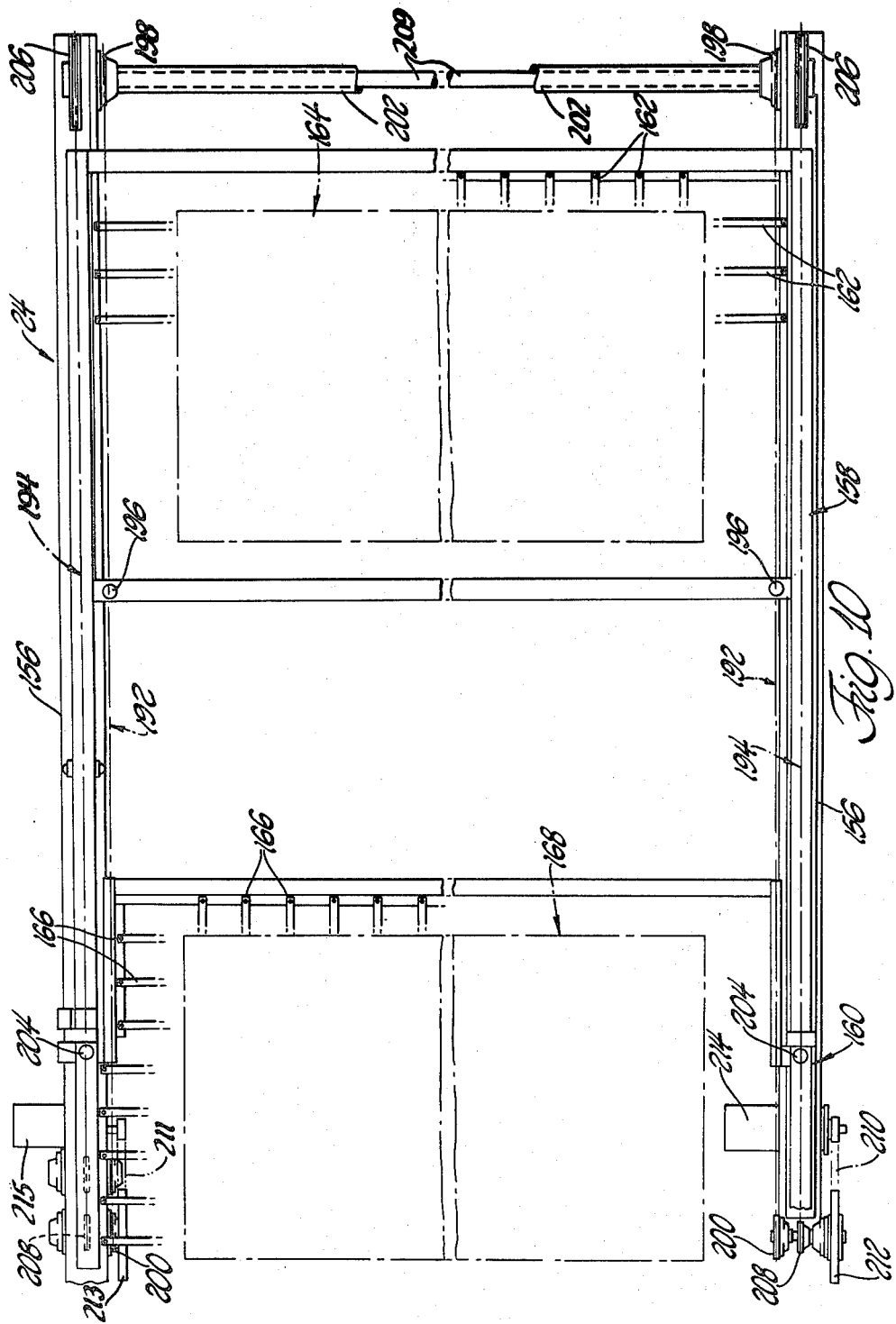

Fig. 11

APPARATUS FOR BENDING AND TEMPERING GLASS SHEETS

This is a division of application Ser. No. 118,822, filed Feb. 5, 1980, now U.S. Pat. No. 4,282,026 as a continuation of application Ser. No. 872,201 which was filed on Jan. 25, 1978 and is now abandoned.

TECHNICAL FIELD

This invention relates to apparatus for bending and tempering sheet glass.

BACKGROUND ART

Bent and tempered glass is used extensively for vehicle side and rear windows to provide good resistance to breakage as well as an aesthetically appearing shape that complements the design of the vehicle. In order to perform the bending and tempering, sheet glass must be heated to its deformation point of about 1200° to 1300° F. and then bent to the required shape before being rapidly cooled by an air spray in order to temper the glass. Tempering greatly increases the mechanical strength of the glass and its resistance to breakage as well as causing the glass to break into small relatively dull pieces when broken instead of into large sharp slivers as is the case with untempered glass.

One manner in which glass is bent and tempered is with press benders having shaped surfaces between which heated glass is clamped to shape it prior to being air cooled by a quench unit to provide tempering. U.S. Pat. Nos. 3,454,389; 3,476,542; 3,488,178; 3,600,150; and 3,951,634 disclose press bending and tempering apparatus for sheet glass.

Sheet glass is also bent and tempered by heating of planar glass sheets while supported on bending molds including movable sections. Prior to softening of the glass during heating, the sections of the mold are oriented to accommodate for the glass sheet planarity. Upon softening of the glass sheet as it is heated, the mold sections move relative to each other under the force of gravity acting on the sheet and the mold sections in order to provide bending of the sheet prior to rapid cooling thereof which provides its tempering. Thin glass, i.e. on the order of $\frac{1}{8}''$, cannot be bent by this apparatus since it does not have sufficient weight to actuate the pivoting of the mold sections until the glass becomes so soft that it overbends. U.S. Pat. Nos. 3,269,822; 3,278,287; 3,307,930; and 3,365,285 disclose this type of bending and tempering apparatus.

Heating of glass sheets prior to bending and tempering thereof has also been performed on fluid support beds as the glass is conveyed through a furnace. Normally the support bed is inclined slightly with respect to the horizontal so that gravity engages an edge of the glass with a movable frame that provides the impetus for glass movement along the bed. There is no contact between the bed and the oppositely facing surfaces of the glass during the conveyance as the glass is heated. This lack of contact prevents marring and scratching of the soft surfaces of the glass as the glass reaches its deformation temperature. However, there normally is mechanical contact with the glass during the bending after the heating in preparation for a cooling quench that tempers the glass in its bent condition. U.S. Pat. Nos. 3,497,340; 3,607,187; and 3,607,200 disclose glass bending and tempering apparatus of this type with a fluid support bed.

Vacuum forming of heated glass sheets is disclosed by U.S. Pat. No. 3,778,244 wherein the sheet glass is first heated during conveyance along a roller hearth conveyor. After heating, a lifter with a curved downwardly facing surface has a vacuum applied thereto about the surface to shape the glass. After shaping against the curved surface of the lifter, the vacuum is terminated to drop the glass onto a mold for conveyance to a waiting operator who removes the glass from the mold. Further vacuum forming of the glass to a curved surface of the mold is also disclosed.

Other bending and tempering apparatus for sheet glass is disclosed by U.S. Pat. Nos. 2,223,124; 2,348,887; 2,646,647; and 2,085,520.

DISCLOSURE OF THE INVENTION

An object of the present invention is to provide improved apparatus capable of bending and tempering thin sheet glass, i.e. on the order of $\frac{1}{8}''$ thick, at relatively high production rates while providing accurate control of the shape to which the glass is bent.

In carrying out the above object, apparatus of the invention includes a furnace with a housing that defines a heating chamber in which glass is heated during conveyance along a roller hearth conveyor. An upwardly opening lower housing portion and a fixed roof of the furnace housing cooperate with vertically movable side doors to define the heating chamber. Lower ends of the doors cooperate with the upper ends of side walls on the lower housing portion to define side slots through which ends of elongated conveyor rolls project outwardly from the heating chamber. Heat seals at the slots limit the loss of heat from the heating chamber to the environment. Continuous drive loops in the form of either chains or solid steel belts support the ends of the conveyor rolls and are slidably driven over external support surfaces extending alongside the slots to support and frictionally drive the rolls. Upward movement of the side doors permits access to the furnace heating chamber for maintenance and repair.

A vacuum holder of the apparatus is positioned within the heating chamber above the conveyor rolls and in one embodiment has a downwardly facing planar surface with restricted openings spaced thereover. A vacuum is drawn within the restricted openings to receive the heated sheet of glass from the conveyor and support the glass above the conveyor in preparation for bending. A greater vacuum is drawn to initially support the glass, while a lesser vacuum is subsequently drawn so as to support the glass without deforming it at the openings in the holder surface. Marring of the glass against the surface is prevented by providing it with a porous cover made of ceramic fibers. The porous cover also distributes the vacuum between the holder openings. Auxiliary lifters positioned between the conveyor rolls are movable upwardly to lift the sheet of glass toward the vacuum holder so as to aid in picking it up off the conveyor. Vertical movement of the vacuum holder is also provided for the same purpose, downward movement of the holder locating its planar surface in proximity to a heated sheet of glass to be picked up, and upward movement of the holder lifting the glass upwardly in a spaced relationship to the conveyor rolls.

Sensing of the glass position along the conveyor and operation of a lateral locator accurately position the glass on the holder surface without requiring the conveyor to be stopped prior to the holder operation. One locator disclosed operates during the conveyance upstream from the holder and includes one sensor upstream from the locator and another sensor between the locator and the holder for sensing the longitudinal position of the glass. Both sensors are coupled to the conveyor drive mechanism and the vacuum holder to coordinate their operation. Another lateral locater disclosed operates after the glass has been lifted by the auxiliary lifters but before it has been initially supported on the holder. A single sensor upstream from this locator is coupled with the conveyor drive mechanism and the auxiliary lifters as well as the vacuum holder to coordinate their operation.

After the sheet of glass is supported on the vacuum holder, a carrier mold preferably in the form of a ring is moved under the glass. Termination of the vacuum then drops the sheet of glass onto the mold ring so that the glass sags within the furnace heating chamber under the bias of gravity from its planar condition to a curved shape of the ring. Maintaining the carrier ring within the heating chamber of the furnace for a predetermined period of time, on the order of one to ten seconds, allows the glass to be bent to the required shape. Only the mold ring has to be changed to bend different size glass to different shapes due to the planarity of the holder surface. Such is not the case with press benders whose curved surfaces can only bend glass to a single curvature.

It is also possible for the center of the holder surface to be slightly raised relative to its perimeter, on the order of $\frac{1}{4}''$ for a 4 foot surface, to reversely bend the glass prior to the gravity bending so as to prevent overbending on the mold ring. To make deep bends, another embodiment of the holder has a curved surface against which the auxiliary lifters form the glass. Further bending by gravity subsequently takes place on the mold ring.

A quench unit of the apparatus is positioned adjacent an end of the furnace housing in which the vacuum holder is received. Movement of the mold ring with the bent glass thereon into the quench unit between upper and lower blastheads thereof provides tempering of the glass. Air flow through nozzles of the blastheads cools the heated glass rapidly as the tempering takes place to increase its resistance to breakage.

One embodiment disclosed includes a damper which, after completion of the tempering, diverts air flow from the upper blasthead to the lower blasthead so that the glass sheet is picked up off the mold ring. The mold ring then moves back to the furnace and the air is diverted back to the upper blasthead to drop the glass onto a delivery conveyor. Glass movement on the delivery conveyor from between the blastheads delivers the glass from the quench unit to an operator.

In another embodiment disclosed, the mold ring carries the glass from the heating chamber to the quench unit for tempering and then to the operator who removes the glass. Subsequently, the mold ring is driven back through the quench unit to the heating chamber ready to begin another cycle.

The auxiliary lifters preferably are T-shaped, each including an upper crossbar and a stem that projects downwardly from the crossbar between the conveyor rolls. This T-shaped lifter construction is strong and operable even when the rolls are closely spaced. Each lifter crossbar includes a woven ceramic cloth cover that engages a heated sheet of glass as the lifter moves upwardly to pick the glass off the conveyor rolls.

The objects, features, and advantages of the present invention are readily apparent from the following description of the best mode for carrying out the invention taken in connection with the accompanying drawings.

BRIEF DESCRIPTION OF DRAWINGS

FIG. 1 is a schematic side elevation view showing one embodiment of glass bending and tempering apparatus constructed according to the present invention;

FIG. 2 is a top plan view of the apparatus taken along line 2—2 of FIG. 1;

FIG. 3 is a schematic view of a furnace and a quench unit of the apparatus taken along line 3—3 of FIG. 1;

FIG. 4 is a top plan view taken along line 4—4 of FIG. 3 showing a carrier mold in the form of a ring on which heated sheet glass is bent under gravity;

FIG. 5 is a side view of the carrier ring taken along line 5—5 of FIG. 4;

FIG. 6 is an enlarged view of a portion of FIG. 4 showing a helical spring that is wrapped about the carrier ring so as to engage the sheet glass with point contact;

FIG. 7 is a bottom plan view taken along line 7—7 of FIG. 8b showing a vacuum holder of the apparatus positioned within the furnace heating chamber;

FIG. 9 is a side elevation view taken along line 9—9 of FIG. 2 showing both the quench unit and portions of the furnace;

FIG. 10 is a top plan view of the quench unit taken along line 10—10 of FIGS. 8a and 8b;

FIG. 11 is a side elevation view of auxiliary lifters of the apparatus taken along line 11—11 of FIG. 8b;

BEST MODE FOR CARRYING OUT THE INVENTION

Referring to FIGS. 1 and 2 of the drawings, one embodiment of the glass bending and tempering apparatus constructed according to the present invention is indicated generally by 20 and includes a furnace 22 as well as a quench unit 24. One end 26 of the furnace 22 receives discrete sheets of glass to be bent and tempered while the other end 28 of the furnace has provisions for bending the glass once it is heated in a manner that is hereinafter described. Quench unit 24 is shown by solid line representation positioned laterally adjacent one side of the furnace end 28 and receives the heated and bent glass to provide tempering thereof in a manner that is likewise hereinafter described. It is also possible for the quench unit 24 to be positioned at the other side of the furnace end 28 or at its longitudinal end as shown by phantom line representation. Quench units can also be provided at any two or all three of these positions to receive heated and bent glass for tempering and thereby increase the system output. The quench unit 24 aligned with the longitudinal direction of the furnace can also be used to temper sheet glass that is not bent.

Figure 8A:
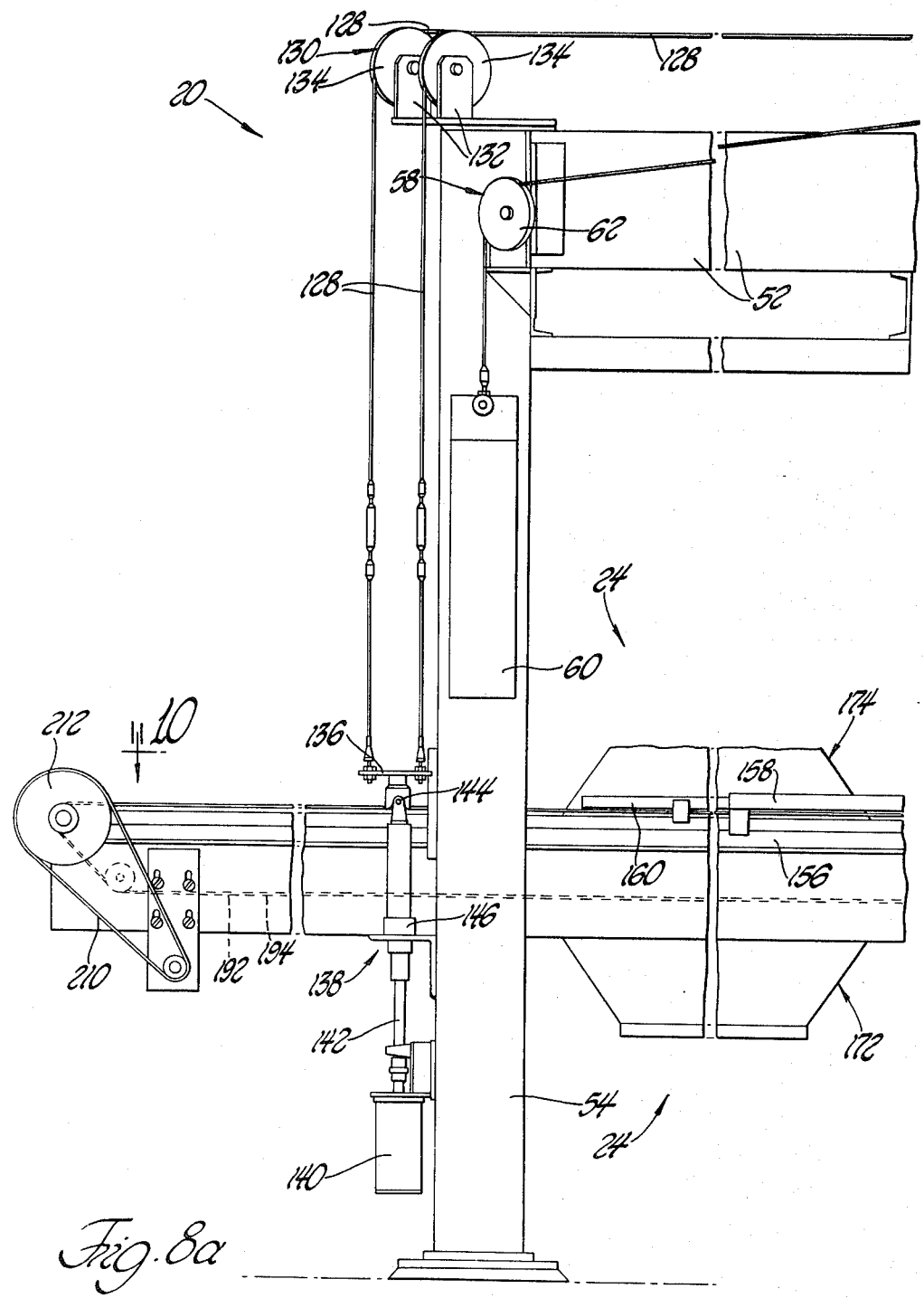
FIG. 8a and 8b are taken in the same direction as FIG. 3 and together show a cross-sectional view of the furnace and quench unit of the apparatus.
Figure 8B:
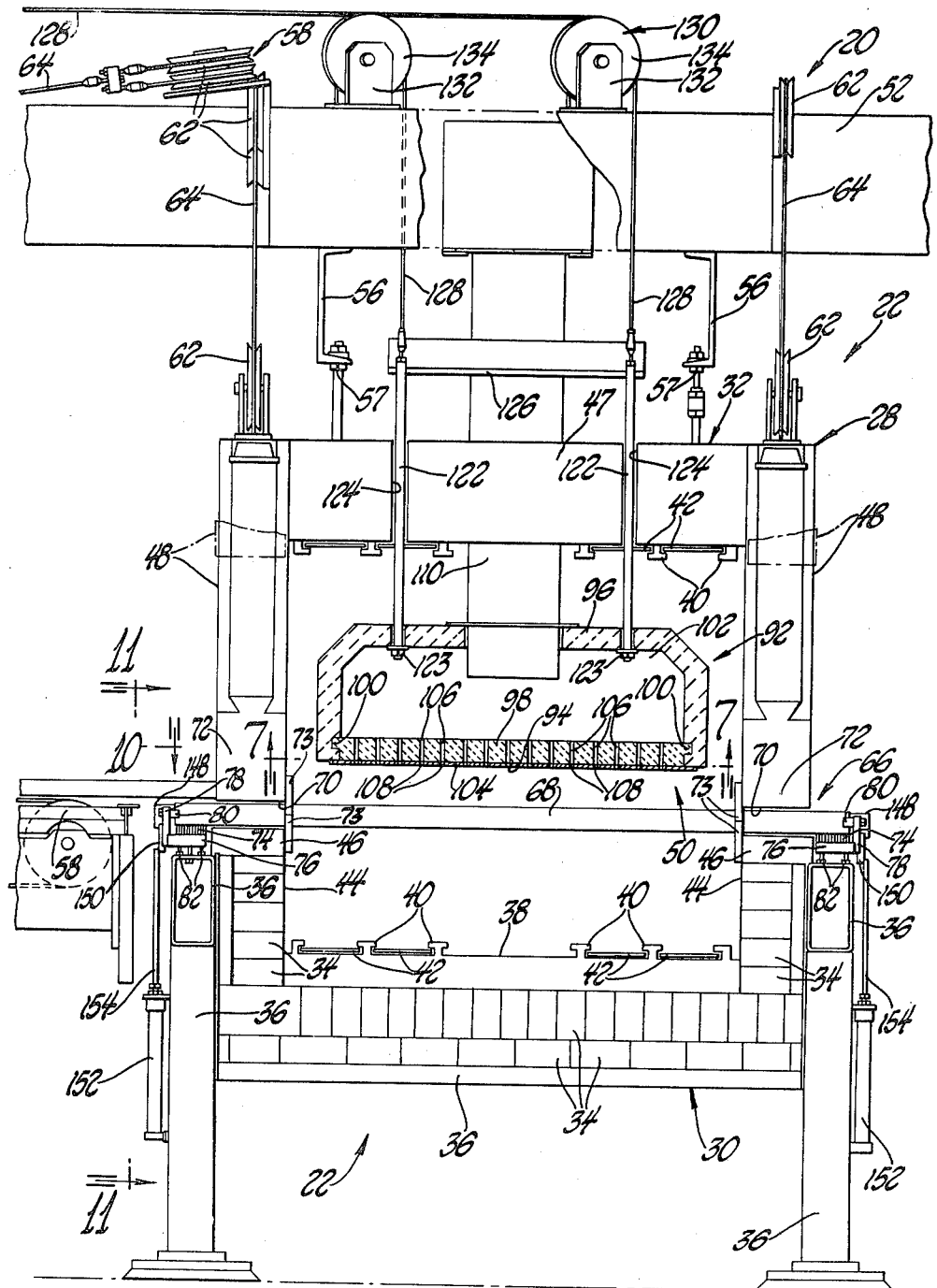

With reference to FIG. 8b, the furnace 22 in which sheet glass is heated includes a housing composed of lower and upper portions 30 and 32, respectively. Lower housing portion 30 is made from refractory blocks 34 mounted on a framework of horizontal and vertical beams 36 defining an upwardly opening U shape. A bottom wall 38 of the lower housing portion 30 is made from a larger refractory block and includes T-shaped retainers 40 for securing heater elements 42. Side walls 44 of the lower housing portion 30 are defined by the refractory blocks 34 extending upwardly from the bottom wall 38 to support upper refractory end blocks 46. Upper housing portion 32 includes a fixed roof 47 and a pair of vertically movable side doors 48 that extend downwardly from the roof in a U shape to cooperate with the upwardly opening U shape of the lower housing portion in defining a heating chamber 50. Fixed roof 47 also has T-shaped retainers 40 and heater elements 42 secured thereby like the bottom wall 38 of the lower housing portion. A horizontal beam 52 is supported at its opposite ends by vertical beams 54 (only one shown in FIG. 8a) and itself supports horizontal beams 56 that mount nut and bolt connectors 57 for securing the roof 47. A pulley system collectively indicated by 58 counterbalances the weight of each door 48 during movement thereof between its lower closed position shown by solid line representation and its upper open position shown by phantom line representation. Pulley system 58 includes a counterweight 60 (FIG. 8a) associated with each side door 48 as well as a number of pulleys 62 over which cables 64 are trained so that the counterweight moves up and down with the door upon manual effort applied to the door independently of the other door. In the open positions of the side doors, the heating chamber 50 is accessible for maintenance and repair. In the lower closed positions, the side doors prevent the escape of heat from the heating chamber 50.

A conveyor of the apparatus is indicated collectively by reference numeral 66 in FIG. 8b and includes a plurality of conveyor rolls 68 (see also FIG. 9) of fused silica particles that are sinter bonded to each other. Ends of each conveyor roll 68 project outwardly through side slots 70 defined between the upper end blocks 46 of the lower housing portion and the lower ends 72 of the vertically movable side doors 48. Heat seals 73 on the blocks 46 and lower door ends 72 seal the slots 70 to prevent the loss of heat from the furnace to the environment and cooperatively define circular openings (not shown) through which the roll ends project. Continuous drive loops 74 in the form of chains or solid steel belts are slidably driven over upwardly facing support surfaces of member 76 that extend alongside the side slots 70 as best seen in FIG. 9. Each roll end is positioned between upwardly extending projections 78 which have idler rollers 80 (FIG. 8b) for preventing movement of the rolls along with the drive loops. Nut and bolt supports 82 mount the support surface members 76 on the horizontal beams 36 in a vertically adjustable manner to maintain planarity of the upper sides of all of the rolls 68. Each end of the horizontal beams 36 mounting the support surface members 76 rotatably mounts a pulley 84 (FIG. 9) over which the associated drive loops 74 are trained. At one end of the conveyor, a cross shaft 85 (FIG. 12) connects the pulleys 84 and a drive mechanism 86 drives these pulleys by a digital drive motor such as the electric stepper motor 88 which drives a chain 90 to pull the drive loops 74 over the support surfaces and thereby frictionally drive the adjacent roll ends. U.S. Pat. Nos. 3,806,312; 3,934,970; 3,947,242; and 3,994,711 disclose this type of frictional roll drive mechanism and the entire disclosure thereof is hereby incorporated by reference.

As seen in FIGS. 3, 7, and 8b, a vacuum holder 92 of the apparatus is positioned within the furnace heating chamber 50 at the end of the furnace adjacent the quench unit 24 and has a downwardly facing planar surface 94. Vacuum holder 92 is seen in FIG. 8b as including an upper portion 96 of a downwardly opening U shape and a lower portion 98 of a relatively thick plate-like construction with edge projections 100 received within associated grooves in the upper portion 96 so as to be secured thereto and cooperate therewith in defining a cavity 102. A sheet-like cover 104 made of ceramic fibers, preferably silica, is compressed in a mat that has a porous construction. Such a silica fiber mat is commercially available and, as such, no further description thereof will be given. Any suitable high temperature adhesive is used to secure cover 104 on the downwardly facing planar surface 94 of the lower holder portion 98. Aligned openings or holes 106 and 108 through the holder portion 98 and the cover 104 communicate with the cavity 102. A vacuum drawn within the cavity 102 through a duct 110 by a vacuum blower 112 (FIG. 3) is thereby drawn in the holes 106 and 108 in order to support a heated sheet of glass on the holder above the conveyor rolls 68 shown in FIG. 8b. Cover 104 prevents marring or scratching of the soft glass surface as the glass sheet is engaged with the holder and, due to its porous construction, distributes the vacuum between the holes.

As the glass sheet is conveyed under the vacuum holder 92, a damper 114 of duct 110 is located in its solid line indicated position of FIG. 3 by an actuator embodied as a cylinder 116. One end of cylinder 116 is pivotally fixed by a pin 118 to a stationary support while a piston rod 119 of the cylinder is secured by a pin 120 to the damper 114. No vacuum reaches the lower holder surface 94 with the damper in this position so that the glass is free to move under the holder. Once the glass is positioned under the holder, the cylinder 116 is supplied pressurized fluid to retract its rod 119 and to move the damper to its position shown by phantom line representation and indicated at 114'. An opening 121 to the environmental atmosphere through duct 110 is open with the damper in its solid line 114 position and closed by the damper in its phantom line position 114'. Vacuum is supplied to the lower holder surface 94 to pick up the sheet of glass with the damper in position 114'. Once the heated glass has been picked up by the vacuum holder, the cylinder 116 is supplied pressurized fluid to extend its connecting rod 119 and position the damper in the partially open position with respect to duct opening 121 as shown by phantom line representation and indicated by 114". Only a partial vacuum is drawn in the holder by the blower 112 with the damper in this partially opened position as a result of the atmospheric pressure that can enter the holder openings through the duct opening 121. This reduction in the drawn vacuum prevents the heated glass which is softened from being deformed in a dimple-like manner at the restricted holes or openings 108 that are spaced over the holder surface 94 as best seen in FIG. 7. The vacuum which is drawn in the partially opened damper position 114" shown in FIG. 3 is about 10% in inches of mercury of the vacuum which is drawn with the damper in its position indicated by 114' where the duct opening is closed. When the vacuum holder 92 is ready to release the lifted sheet of glass, as is hereinafter described, the cylinder 116 is supplied pressurized fluid to extend its piston rod 119 in order to locate the damper 114 in its solid line indicated position so that the vacuum drawn at the lower holder surface 94 is terminated in order to let the glass drop under the force of gravity.

In connection with the operation of the vacuum holder, reference should be made to the U.S. patent application Ser. No. 872,202 filed Jan. 25, 1978 and now abandoned, of Harold A. McMaster and John Stephen Nitschke which was filed concurrently with the grandparent application hereof and is hereby incorporated by reference, application Ser. No. 872,202 having been abandoned by filing on Dec. 11, 1978 of a continuation-in-part application Ser. No. 968,231 which issued on May 13, 1980 as U.S. Pat. No. 4,202,681.

Two modes of operation are provided for facilitating the vacuum holder pickup of sheet glass from the conveyor. As seen in FIG. 8b, vacuum holder 92 is supported below the housing roof 47 by vertical rods 122 whose lower ends are threaded to receive nuts 123. Holes 124 in the roof 47 receive intermediate portions of the rods 122 to allow vertical movement thereof and upper ends of the rods are interconnected by a bar 126 and secured to cables 128 of a pulley system 130. Brackets 132 rotatably support pulleys 134 of this system on the horizontal beam 52 shown in both FIGS. 8a and 8b and the cables 128 are trained over these pulleys. As seen in FIG. 8a, a common plate 136 of a cylinder actuator 138 is connected to the cables 128. Actuator 138 includes a cylinder 140 mounted on the vertical beam 54 and having a piston connecting rod 142 connected to the plate 136 by a pin 144. Guide 146 is mounted by a bracket on the vertical beam 54 and guides the rod 142 during upward and downward extending movement by the cylinder 140 upon being supplied a suitable pressurized fluid. Upward movement of the rod 142 allows the cables 128 to lower the holder 92 shown in FIG. 8b toward the conveyor rolls 68 in order to facilitate pickup of the glass by a vacuum supplied in the manner previously discussed. After the pickup, the vacuum holder 92 is raised by downward movement of the rod 142 shown in FIG. 8a so as to move the supported sheet of glass on the holder upwardly away from the conveyor.

Figure 11:
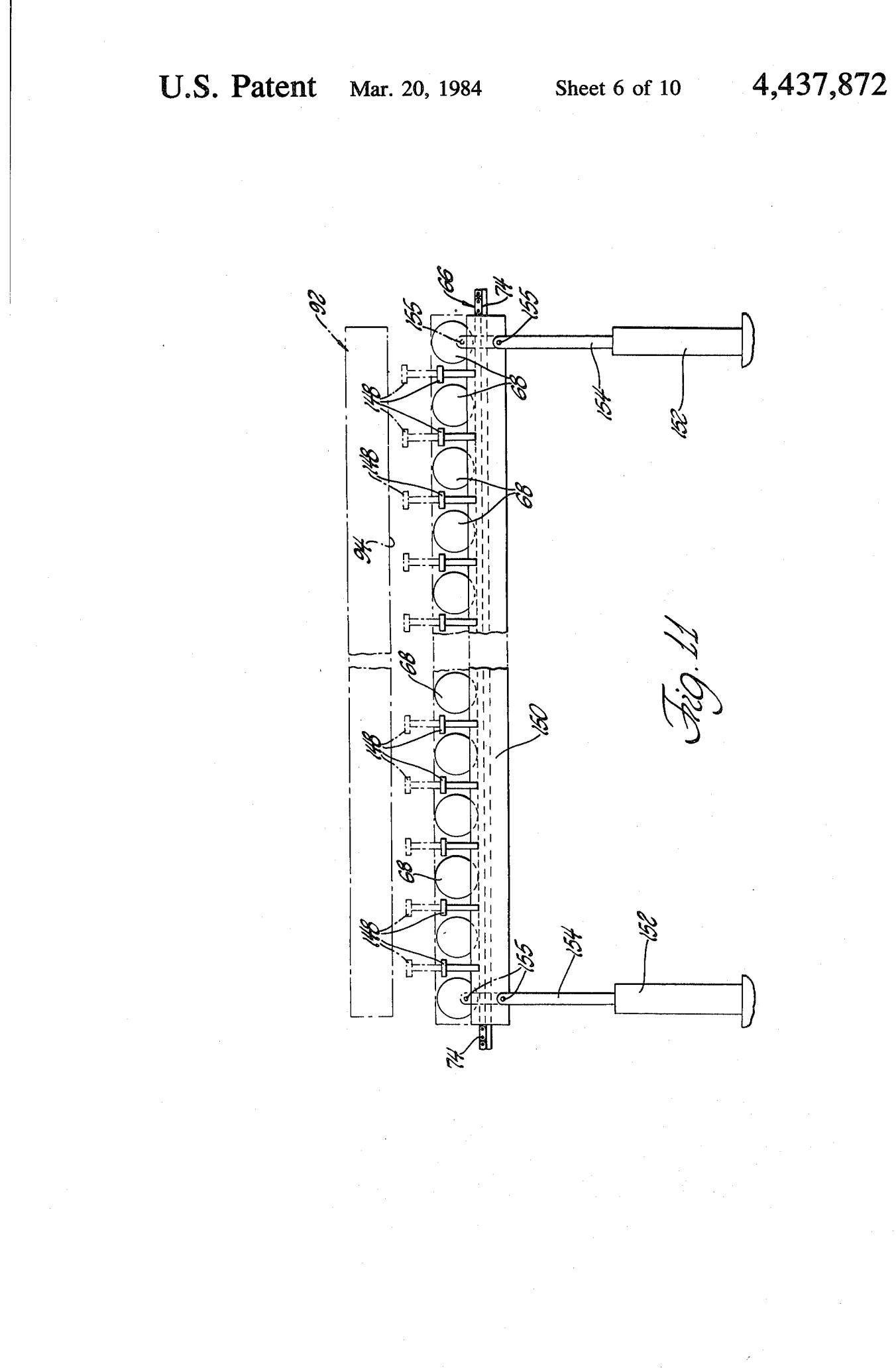

Auxiliary lifters 148 shown in FIG. 11 are positioned between the conveyor rolls 68 and provide another mode of operation for facilitating the vacuum sheet glass pickup by the holder 92. Auxiliary lifters 148 have T-shaped cross sections and extend parallel to the conveyor rolls 68 and transversely with respect to the direction of sheet glass conveyance within the furnace. Opposite ends of the lifters 148 extend outwardly through the furnace housing side slots and are supported by elongated bars 150 at the sides of the furnace, these bars being notched to receive the lower ends of the lifters. A pair of cylinders 152 mounted on the vertical beams 36 as shown in FIG. 8b have connecting rods 154 with upper ends connected to the bar 150 by pins 155 seen by reference back to FIG. 11. Pressurized fluid is supplied to cylinders 152 in order to extend their rods 154 and raise the associated bar 150 as well as the auxiliary lifters 148 from the solid line indicated position of FIG. 11 to its phantom line indicated position in order to lift the heated sheet of glass upwardly toward the vacuum holder 92. This upward movement of the glass positions it in proximity to the lower surface 94 of the vacuum holder so as to facilitate the glass pickup. After the vacuum holder is supporting the glass, cylinders 152 are supplied pressurized fluid to retract their piston connecting rods 154 so as to lower the auxiliary lifters 148 back between the conveyor rolls 68.

Rather than using a pair of cylinders for moving each bar 150, it is possible to use a single cylinder and interconnected linkages operated by the cylinder. Such a single cylinder linkage support of the auxiliary lifter bars 150 ensures coordinated movement of the bars.

As seen by combined reference to FIGS. 8a, 8b, and 10, spaced rails 156 of the quench unit 24 mount a pair of carriers 158 and 160 for movement perpendicular to the direction of glass conveyance within the furnace. Carrier 158 includes crossing straps 162 (FIG. 10) on which a mold in the form of a carrier ring 164 (hereinafter more fully described) is supported for movement between the furnace 22 and the quench unit 24. Carrier 160 likewise includes crossing straps 166 on which a delivery ring 168 is supported for movement between the quench unit and an operator who stands adjacent the apparatus at the left-hand side of FIG. 8a. Carrier 158 extends into the furnace heating chamber in a cantilevered manner upon movement to the right to position ring 164 below the vacuum holder 92. In this position, the carrier extends through the housing side slot 70 at the adjacent side of the furnace. Movement of the carrier 158 to the left pulls the ring 164 out of the furnace through this side slot 70 and moves it into the quench unit 24.

During use, carrier 158 shown in FIG. 10 moves the mold ring 164 beneath the vacuum holder 92 with a heated sheet of glass supported on its lower planar surface 94. Vacuum supplied to the holder 92 is then terminated so that the heated glass drops down onto the mold ring 164 within the furnace heating chamber 50. A helical spring 170, see FIGS. 4–6, is wrapped about ring 164 in a helical shape and engages the periphery of the glass with point contact so as to minimize any cooling effect that the ring will have on the glass. Due to its heated condition, the planar sheet of glass begins to sag under the bias of gravity so as to assume the curved shape of the ring as seen in FIG. 5. Carrier 158 continues to position the mold ring 164 within the heating chamber for a momentary dwell period so that the glass sags a sufficient extent without oversagging, this period of time depending upon the particular configuration to which the glass is to be bent. After this dwell within the furnace, normally for one to ten seconds, the carrier 158 moves from the furnace heating chamber 50 shown in FIG. 8b to the quench unit 24 shown in FIG. 8a and positions the bent sheet of glass between lower and upper blastheads 172 and 174 of the quench unit. Each of these blastheads is preferably of the type disclosed in U.S. Pat. No. 3,936,291, the entire disclosure of which is hereby incorporated by reference.

A blower 176 shown in FIGS. 3 and 9 supplies a duct 178 with air that acts as a cooling fluid. Branch ducts 180 and 182 from duct 178 respectively feed the lower and upper blastheads 172 and 174 so that the air is sprayed from the blastheads through nozzles thereof onto the opposite surfaces of the bent glass carried by the mold ring 164. This air supply rapidly cools the glass surfaces to temper the glass and thereby increases its mechanical strength as well as causing the glass to break into small dull pieces. Carrier 158 preferably oscillates back and forth between the blastheads to uniformly distribute the impingement of cooling air with the glass. An actuator in the form of a cylinder 184 is then supplied pressurized fluid to extend its piston connecting rod 186 and to move the damper 188 of duct 182 from the solid line position to the phantom line position shown in FIG. 3. This damper movement closes the branch 182 to the air flow from the blower 176 and diverts the air supply from the upper blasthead 172 through the duct 180. Air thus supplied through the lower blasthead 172 impinges with the lower surface of the bent and tempered glass sheet and lifts this glass sheet upwardly off of the mold ring 164 into suspended engagement with suitable bumpers 190 (FIG. 9) on upper blasthead 174 so that the mold ring carrier 158 shown in FIG. 10 can move toward the right back into the furnace ready to pick up another piece of glass for another cycle. Subsequently, the carrier 160 also moves to the right to position its delivery ring 168 below the suspended sheet of glass engaged with the upper blasthead.

When the delivery ring 168 shown in FIG. 10 is positioned below the upper blasthead 174 against which the bent and tempered sheet of glass is suspended, the cylinder 184 of FIG. 3 is supplied a pressurized fluid to retract its rod 186 and pivot the damper 188 from its phantom line closed position to its solid line open position. Air from the blower 176 is then again supplied to the upper blasthead 174 as well as to the lower blasthead 172 so that the lifted sheet of glass drops down onto the delivery ring. Prior to the next sheet of glass being moved from the furnace to the quench unit by the carrier 158 shown in FIG. 10, the carrier 160 moves the delivery ring to the left side of the apparatus as viewed in FIG. 8a where a waiting operator can pick the glass off of the ring. Delivery ring 168 thus functions as a delivery conveyor for the tempered glass. Suitable after-cooling blastheads may follow the quench blastheads and thereafter cool the glass to room temperature before conveyance to the operator.

As seen in FIG. 10, actuators for moving the carriers 158 and 160 are embodied as continuous drive chains 192 and 194, respectively. Drive chains 192 are located at the opposite sides of the quench unit and secured by connectors 196 to the carrier 158. Chain sprockets 198 and 200 have the chains 192 trained over them with the sprockets 198 interconnected by a hollow cross-shaft sleeve 202 that couples the chains 192 for operation with each other. Likewise, chains 194 are secured to the carrier 160 by connectors 204 and are trained over sprockets 206 and 208 which are respectively aligned with the sprockets 198 and 200. A cross shaft 209 extends through sleeve 202 and interconnects the sprockets 206 with each other. Drive chains 210 and 211 shown in FIG. 10 drive respective sprockets 212 and 213 from digital drives such as the electric stepper motors 214 and 215 in order to move the carriers 158 and 160 by the actuator chains 192 and 194 independently of each other. Stepper motor 214 provides rapid movement of the carrier 160 on which the mold ring 164 is thereby moved from the furnace into the quench unit without significant heat loss. Accurate control of the acceleration and decleration involved is also possible with the stepper motor drive of the carrier ring to prevent the glass from being marred by sliding on the ring as it starts and stops.

Reference should be made to the U.S. patent application of Harold A. McMaster and John Stephen Nitschke, Ser. No. 872,128 filed Jan. 25, 1978 and now abandoned, which was filed concurrently with the grandparent application hereof and is hereby incorporated by reference, for a more complete understanding of the manner in which carrier 158 is driven between the furnace and the quench unit.

The manner in which the vacuum holder picks up the heated glass from the conveyor and maintains the glass planar prior to dropping the glass onto the mold ring for bending under gravity gives great production flexibility for bending and tempering glass of different sizes and shapes. Any size and shape of glass can be bent and tempered on the apparatus without changing the vacuum holder due to the planar shape of its surface 94. Only the shape and size of the mold ring 164 (FIGS. 4-6) must be changed in order to accommodate for bending and tempering of different size and shape glass sheets. Also, locating the quench unit 24 laterally with respect to the direction of glass conveyance through the furnace 22 from its end 26 to end 28 (see the solid line position of the quench unit in FIG. 2) allows the glass to also pass straight out the furnace end 28 through a door opening 216 (FIG. 9) where a quench unit for tempering planar sheet glass can be located. As previously mentioned, another quench unit can also be located on the opposite side of the furnace end 28 shown in FIG. 2 from the quench unit 24 so that glass sheets can be received from the furnace and transferred to the quench units on both sides of the furnace for tempering after first being bent in order to increase production output.

Planar surface 94 of the vacuum holder may have its center slightly raised with respect to its periphery, i.e. about one quarter of an inch higher on a surface of a 4 foot dimension so that the surface is not completely planar although it is generally planar. Such a slightly concave downward but generally planar surface reversely bends the glass prior to the bending on the ring to prevent overbending under the force of gravity.

Figure 12:
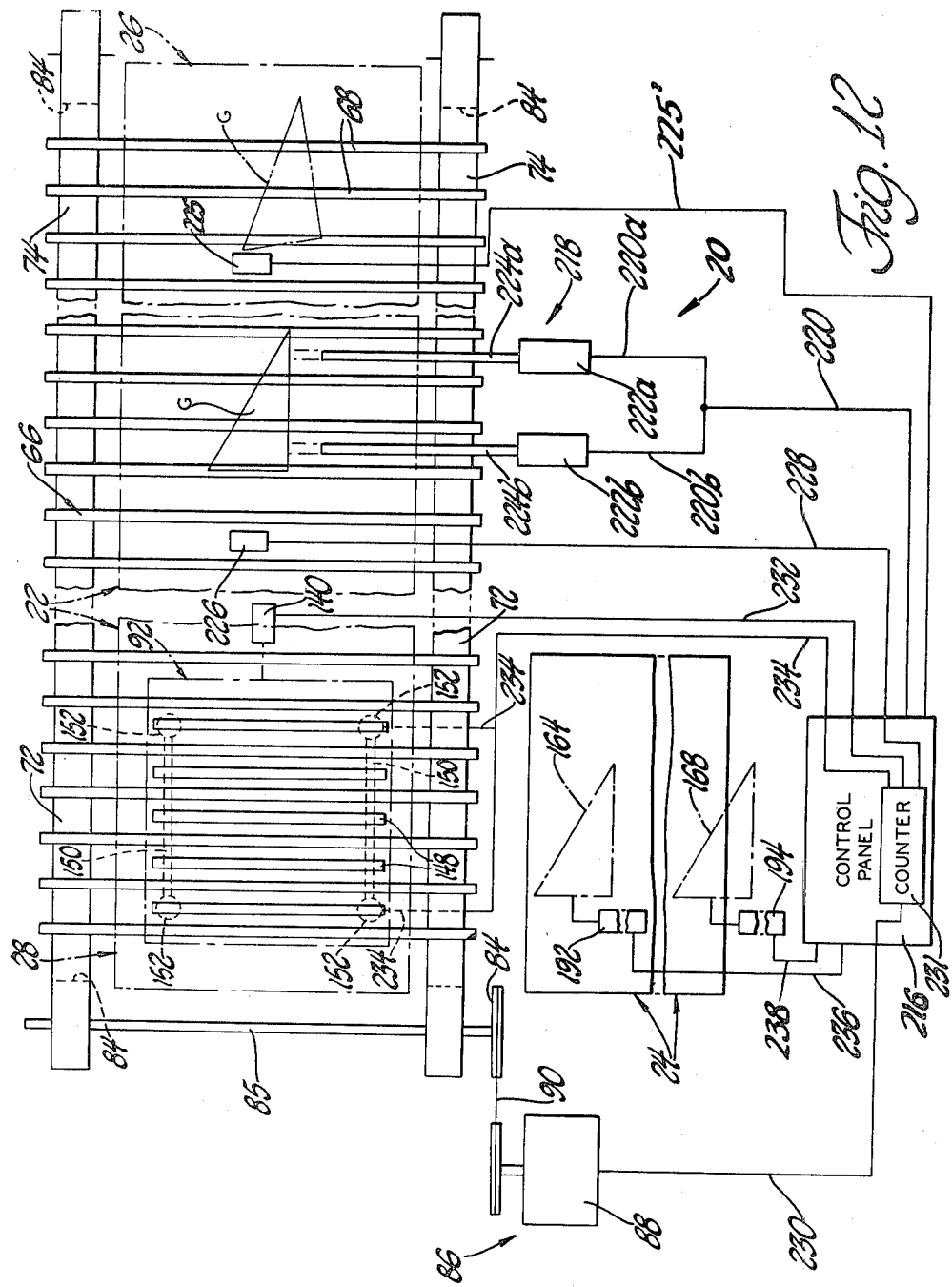
FIG. 12 is a top plan schematic view of the apparatus.

With reference to FIG. 12, a control panel 216 of the glass bending and tempering apparatus 20 is coupled to a lateral locator 218 by electrical or hydraulic lines 220 and 220and b. Locator 218 includes a pair of cylinders 222a and 222b which have associated piston connecting rods 224a and 224b that extend into the housing of furnace 22 through the side slots from which the conveyor rolls 68 project outwardly to be driven by the continuous drive loops 74. As the sheets of glass G are conveyed from the right to the left over the conveyor rolls, a first photoelectric sensor 225 coupled to panel 216 by a line 225' senses the glass to thereby actuate locator cylinders 222a and b so as to extend their piston connecting rods 224a and b. Engagement of the rods with the sheets of glass G properly locates the glass at the correct lateral location on the rolls with respect to the vacuum holder in the proper angular orientation. Any improper angularity or lateral positioning of the sheets of glass G on the rolls is thus corrected by this locator 218. A second photoelectric sensor 226 positioned within the furnace 22 and coupled to control panel 216 by a line 228 senses the leading edge of the located glass sheet G as it is conveyed toward the left past the locator 218. It will be noted that the glass sheets G are triangular in shape as shown, being designed as control vent windows for vehicles. Two sensors are necessary since the location of the leading glass edge can change as the glass slides along the rolls during operation of the locator 218. The exact position of the sheet glass with respect to the vacuum holder 92 is known at all times since the electric motor 88 of drive mechanism 86 is coupled by a line 230 to a counter 231 of the control panel 216 as is the sensor 226 by line 228. Control lines 232 and 234 connect the vacuum holder cylinder actuator 140 and the auxiliary lifter cylinder actuators 152, respectively, to the control panel 216 and counter 231 thereof so that operation of these components is coupled with the sensing of the glass position by counting each motor revolution. Glass can thus be picked up off of the conveyor without first stopping its movement while always properly locating the glass longitudinally along the direction of conveyance with respect to the mold ring 164 that has a corresponding triangular shape with a required curvature for bending of the glass. The chain actuators 192 and 194 for moving the mold and delivery rings 164 and 168 are also coupled by lines 236 and 238 to the control panel 216 in order to coordinate the movement of the sheet glass to the quench unit 24 from the furnace 22 and from the quench unit to the operator.

Figure 13:
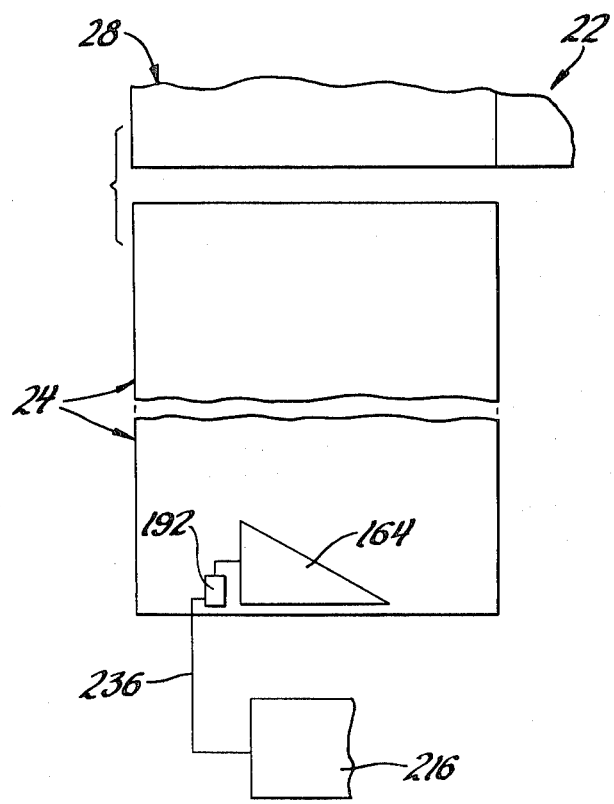
FIGS. 13 and 14 are schematic views of other embodiments of apparatus according to the present invention.

FIG. 13 is a schematic view similar to a portion of FIG. 12 of another embodiment of the apparatus. Mold ring 164 is moved by its stepper motor driven chain actuator 192 from the furnace end 28 to and through the quench unit 24 in this embodiment. There is no transfer of the glass to another delivery ring by diverting air flow to the lower blasthead from the upper blasthead as with the previous embodiment of FIGS. 1-12. After removal of the glass from ring 164 by the operator, the ring is driven back to the furnace ready to begin another cycle.

With both embodiments of the apparatus, the mold ring 164 is preferably reciprocated by its carrier drive within the quench unit 24 to distribute the flow of air sprayed onto the glass. This distribution provides uniformity to the tempering of the glass.

Figure 14:
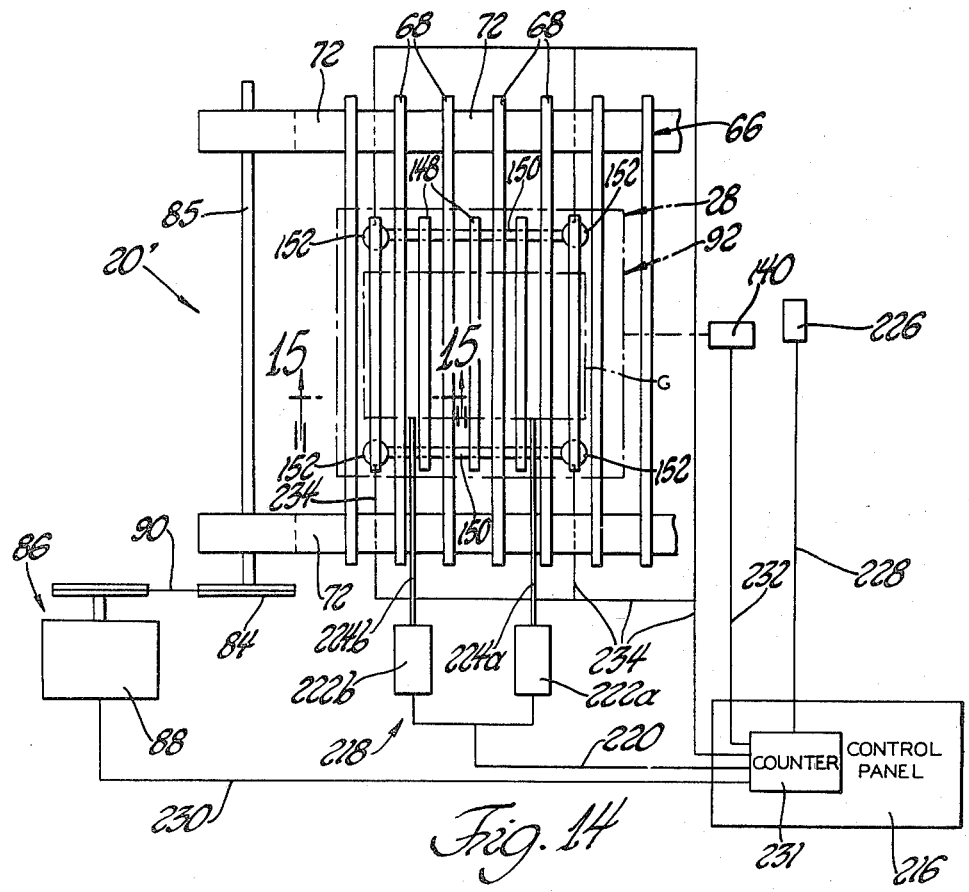

A modified version of the apparatus is shown in FIG. 14 and indicated by 20'. Except as will be noted, many of the components of this modified apparatus are the same as the previously described apparatus and as such bear like reference numerals. However, the locator 218 is located adjacent the vacuum holder 92 rather than upstream from the single sensor 226. The longitudinal position of the sheet of glass G is sensed by sensor 226 to control operation of the vacuum holder 92. After cylinders 152 raise the bars 150 and the auxiliary lifters 148, the sheet of glass G supported on the auxiliary lifters is engaged by extension of the rods 224a and b of the locator cylinders 222a and b and slid along the auxiliary lifters to the proper angular orientation and lateral position. Vacuum subsequently supplied to the holder 92 in the same manner previously described then engages the sheet of glass with its downwardly facing lower surface so that the auxiliary lifters can subsequently be lowered prior to the mold ring moving under the vacuum holder. Control panel 216 and its counter 231 coupled to the electric motor 88, the vacuum holder cylinders 140 and 152, the locator 218, and the sensor 226 provide sequenced operation of the apparatus.

Figure 15:
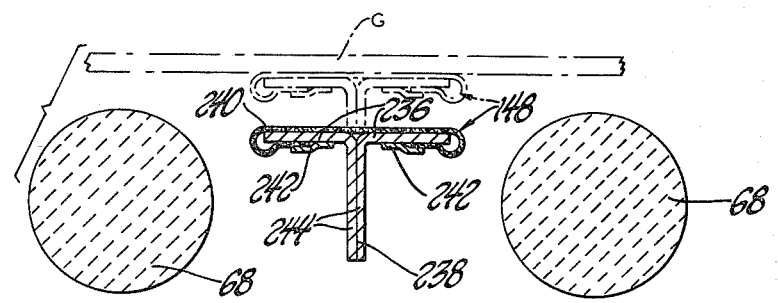
FIG. 15 is a sectional view taken along line 15—15 of FIG. 14 showing a conveyor roll and lifter construction of the apparatus.

Auxiliary lifters 148 each have the T shape shown in FIG. 15 and include an upper cross bar 236 and a lower stem 238 that projects downwardly from the crossbar. This T shape provides a rigid auxiliary lifter than can be positioned between the conveyor rolls 68, even when the rolls are closely spaced, and nevertheless function as required. Crossbar 236 can have a width greater than the spacing between the rolls 68 and still be located below the upper sides of the rolls in the lower position so that the glass G can be conveyed on the rolls prior to being picked up as shown by the phantom line indicated position. A cover 240 of woven ceramic cloth, i.e. fiber glass cloth, over the upper side of the crossbar 236 is secured by clips 242 and engages the glass G as it is picked up and slid along the auxiliary lifter by the locator 218 previously described in connection with FIG. 14. Two L-shaped steel members 244 are secured to each other in a suitable manner such as by welding or rivets to provide the T shape of the lifter 148. Of course, it is also possible to utilize a unitary member of a T shape to provide the auxiliary lifter. Likewise, it is possible for the cover 240 to have a tubular shape through which the auxiliary lifter stems rather than providing the securement clips 242.

Figure 16:
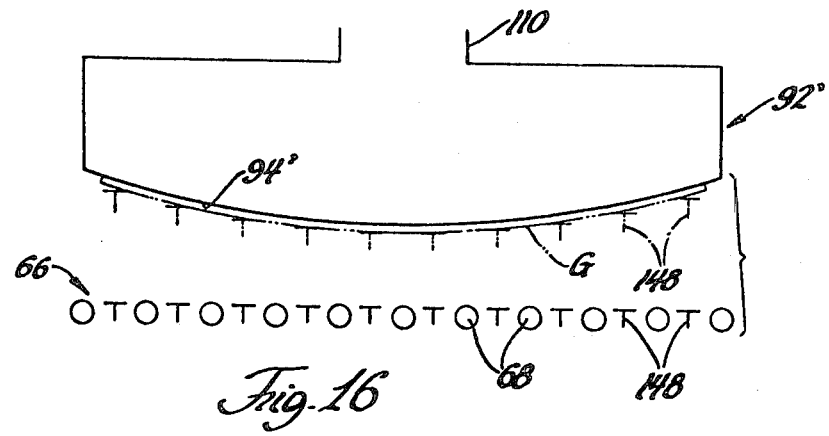
FIGS. 16 and 17 are schematic elevation views of another embodiment of the vacuum holder.
Figure 17:
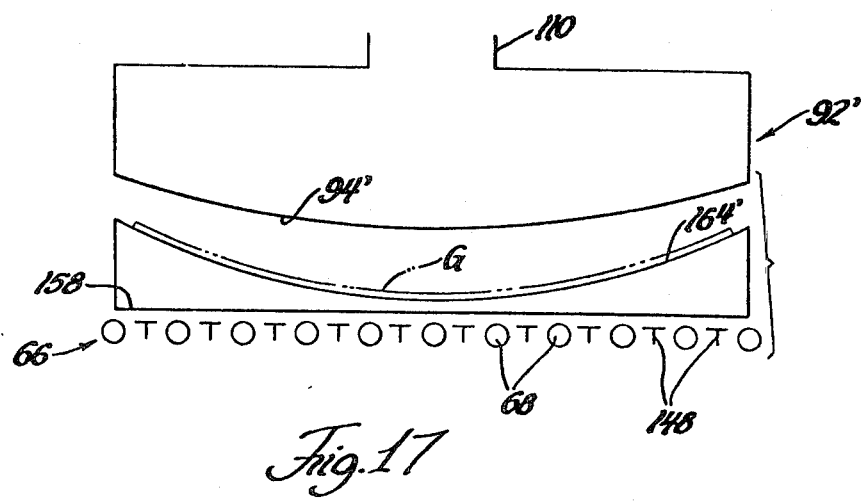

With reference to FIGS. 16 and 17, a modified embodiment 92' of the vacuum holder is shown as having a downwardly facing surface 94' which is of a curved shape. A heated sheet of glass is conveyed under the vacuum holder 92' by the conveyor 66 and then lifted upwardly by the auxiliary lifters 148 which move from the solid line position of FIG. 16 to the phantom line position thereof to engage the sheet of glass G as shown against the curved surface 94'. Ends of the auxiliary lifters 148 are supported by a suitable power-operated actuator which is capable of lifting auxiliary lifters at the left and right extremes a greater distance than the ones in the center to conform the sheet of glass with the downwardly convexed shape of the curved surface on the vacuum holder. A vacuum drawn within the holder 92' then supports the sheet of glass against the surface 94' and the auxiliary lifters 148 are moved downwardly. Carrier 158 then moves the mold ring 164' beneath the holder 92' and the vacuum being drawn is terminated so that the sheet of glass G drops onto the mold ring. It will be noted that the mold ring 164' has a greater curvature than the vacuum holder surface 94'. Further bending of the sheet of glass G thus takes place on the mold ring 164' under the bias of gravity. Carrier 158 then moves the mold ring 164' from below the vacuum holder 92' out of the furnace heating chamber and into the quench unit in the same manner previously described.

Relatively deep bends can be made by the prebending on the holder surface and the subsequent gravity bending on the ring as described in connection with FIGS. 16 and 17.

While the best mode for practicing the invention has herein been described in detail, those skilled in this art will recognize various alternative designs and embodiments for practicing the present invention as defined by the following claims.

What is claimed is:

1. A method of shaping glass sheets, comprising the steps of:
heating a glass sheet to approximately its softening point;
supporting the heat-softened glass sheet in an essentially horizontal orientation on support means;
bringing the upper surface of the glass sheet into close proximity to a flat platen in communication with a source of vacuum;
drawing a vacuum through the platen so as to retain the glass sheet on the platen;
vertically separating the platen and the glass sheet carried thereon from the support means;
bringing into vertical alignment with and beneath the glass sheet held on the platen a shaping mold having a contour defining the desired contour for the glass sheet; and releasing the glass sheet from the platen so as to fall onto the shaping mold and conform to the contour defined by the shaping mold.

2. The method of claim 1 wherein after the glass sheet has fallen onto the shaping mold, the shaping mold carries the glass sheet out from under the platen into a tempering station where the glass sheet is rapidly cooled by blasts of tempering fluid so as to temper the glass.

3. The method of claim 1 wherein the glass sheet is brought into close proximity to the platen by lowering the platen, after which the glass sheet is separated from the support means by raising the platen, and then the shaping mold is brought into alignment beneath the glass sheet by shuttling the shaping mold along a horizontal path.

4. The method of claim 1 wherein release of the glass sheet from the platen is effected by rapid release of the vacuum in the platen to a level insufficient to support the glass sheet.

5. The method of claim 1 wherein the glass sheet, as it falls onto the shaping mold, first comes into contact with portions of the shaping mold at the highest elevation, and the glass sheet is then forced to bend toward portions of the shaping mold at lower elevations by momentum generated by the fall.

6. The method of claim 2 or 5 wherein the shaping mold onto which the glass sheet is dropped is a ring conforming to the outline of the glass sheet.

7. A method of shaping glass sheets, comprising the steps of:

heating a glass sheet to approximately its softening point and bringing the glass sheet to rest on support means;

translating a vacuum platen having a flat, perforated surface toward the support means to bring the flat, perforated surface into close proximity to, and parallel with, a surface of the glass sheet;

drawing vacuum through the flat, perforated surface so as to retain the glass sheet on the platen;

translating the platen away from the support means to lift the glass sheet from the support means and to bring the glass sheet into a generally horizontal orientation on the underside of the platen;

bringing into the vertical alignment with and beneath the glass sheet held on the platen a shaping mold having a contour defining the desired contour for the glass sheet; and releasing the glass sheet from the platen so as to fall onto the shaping mold and conform to the contour defined by the shaping mold.

8. The method of claim 7 wherein after the glass sheet has fallen onto the shaping mold, the shaping mold carries the glass sheet out from under the platen into a tempering station where the glass sheet is rapidly cooled by blasts of tempering fluid so as to temper the glass.

9. The method of claim 7 wherein the glass sheet is brought to rest in a generally horizontal orientation beneath the vacuum platen, the vacuum platen reciprocates in a vertical direction to engage and lift the glass sheet, and the shaping mold is brought into alignment beneath the glass sheet by shuttling the shaping mold along a horizontal path.

10. The method of claim 7 wherein release of the glass sheet from the platen is effected by rapid release of the vacuum in the platen to a level insufficient to support the glass sheet.

11. The method of claim 7 wherein the glass sheet, as it falls onto the shaping mold, first comes into contact with portions of the shaping mold at the highest elevation, and the glass sheet is then forced to bend toward portions of the shaping mold at lower elevations by momentum generated by the fall.

12. The method of claim 8 or 11 wherein the shaping mold onto which the glass sheet is dropped is a ring conforming to the outline of the glass sheet.

13. An apparatus for shaping glass sheets comprising:

furnace means for heating glass sheets to a softened condition;

support means for supporting glass sheets;

conveyor means for transferring heated glass sheets to the support means;

a platen having a flat perforated plate and having an enclosed interior space in communication with a source of vacuum;

means for transferring the platen into and out of close proximity to the support means so as to lift the glass sheet from the support means by means of vacuum;

a shaping mold having upwardly facing shaping surfaces defining the desired curvature and corresponding to the shape of the glass sheets; and shuttle means for alternately bringing the platen and the shaping mold into and out of superimposed vertically spaced relationship to each other, wherein the shaping mold in the superimposed position is supported at an elevation below the platen so as to receive and shape a glass sheet dropped from the platen.

14. The apparatus of claim 13 wherein said conveyor means includes at least one roll extending transversely across the path of glass sheet travel onto said support means.

15. The apparatus of claim 13 further including elevator means for vertically reciprocating the platen into and out of close proximity to the support means.

16. The apparatus of claim 15 wherein the shuttle means is provided with drive means to horizontally reciprocate the shaping mold into and out of said vertically spaced relationship to the platen.

17. The apparatus of claim 13 further including means to apply blasts of tempering fluid onto a glass sheet resting on the shaping mold.

18. The apparatus of claim 13 further including in association with said support means, aligning means for engaging glass sheets entering upon the support means and for bringing the glass sheets to rest in a predetermined position upon the support means.

19. The apparatus of claim 13 wherein the shaping mold comprises an open ring corresponding to the outline of the glass sheet.

* * * * *